US011930145B2

(12) United States Patent
Michishita

(10) Patent No.: US 11,930,145 B2
(45) Date of Patent: Mar. 12, 2024

(54) IMAGE FORMING APPARATUS COMMUNICABLE WITH COMMUNICATION APPARATUS, CONTROL METHOD FOR SAME, AND STORAGE MEDIUM

(71) Applicant: CANON KABUSHIKI KAISHA, Tokyo (JP)

(72) Inventor: Takumi Michishita, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/841,811

(22) Filed: Jun. 16, 2022

(65) Prior Publication Data

US 2022/0417383 A1  Dec. 29, 2022

(30) Foreign Application Priority Data

Jun. 25, 2021  (JP) .................. 2021-105934

(51) Int. Cl.
*H04N 1/00* (2006.01)
*H04N 1/32* (2006.01)

(52) U.S. Cl.
CPC ..... *H04N 1/32101* (2013.01); *H04N 1/00244* (2013.01); *H04N 1/00344* (2013.01); *H04N 1/00832* (2013.01); *H04N 1/32358* (2013.01); *H04N 2201/3202* (2013.01)

(58) Field of Classification Search
None
See application file for complete search history.

(56) References Cited

U.S. PATENT DOCUMENTS

| 2006/0085697 A1* | 4/2006 | Takeuchi | H04N 1/32122 714/50 |
| 2008/0005176 A1* | 1/2008 | Shimizu | H04N 1/00244 |
| 2010/0177344 A1* | 7/2010 | Matsumoto | H04N 1/00344 358/1.15 |
| 2010/0238490 A1* | 9/2010 | Sato | G06F 3/1203 358/1.15 |

(Continued)

FOREIGN PATENT DOCUMENTS

| CN | 104021088 | * | 9/2014 | ............ G06F 12/02 |
| CN | 113885784 | * | 1/2022 | ............... G06F 3/06 |

(Continued)

*Primary Examiner* — Beniyam Menberu
(74) *Attorney, Agent, or Firm* — ROSSI, KIMMS & McDOWELL LLP

(57) ABSTRACT

An image forming apparatus that is capable of reducing network traffic in sending an audit log. The image forming apparatus is communicable with a communication apparatus. The audit log including multiple types of logs is stored in at least one of the storage device or an external storage device. On receiving from the communication apparatus a request for sending the audit log, the image forming apparatus performs control for sending the audit log to the communication apparatus. In the control for sending the audit log, on receiving the request for sending the audit log, the image forming apparatus sends, to the communication apparatus, information indicating a storage location of one or more logs each having a data amount larger than a predetermined amount among the logs included in the audit log, rather than the one or more logs.

8 Claims, 7 Drawing Sheets

(56) References Cited

U.S. PATENT DOCUMENTS

| | | | |
|---|---|---|---|
| 2011/0066653 A1* | 3/2011 | Uruma | G06F 21/552 707/821 |
| 2011/0149344 A1* | 6/2011 | Nakamura | G06F 11/0733 358/1.15 |
| 2011/0286035 A1* | 11/2011 | Uruma | G06F 11/3476 358/1.15 |
| 2014/0063546 A1* | 3/2014 | Nakayama | G06F 3/1207 358/1.15 |
| 2014/0063548 A1* | 3/2014 | Nagai | G06K 15/40 358/1.15 |
| 2014/0289370 A1* | 9/2014 | Hamada | H04L 67/1001 709/219 |
| 2015/0149536 A1* | 5/2015 | Nishikawa | H04L 67/34 709/219 |
| 2021/0056074 A1* | 2/2021 | Zhu | G06F 16/182 |

FOREIGN PATENT DOCUMENTS

| | | | | |
|---|---|---|---|---|
| JP | 2006301856 | * | 11/2006 | G06F 3/12 |
| JP | 2007241567 | * | 9/2007 | G06F 13/00 |
| JP | 2008065490 | * | 3/2008 | B41J 29/00 |
| JP | 2009134413 | * | 6/2009 | B41J 5/30 |
| JP | 2010085347 | * | 4/2010 | G01N 21/89 |
| JP | 2015035123 | * | 2/2015 | G06F 3/12 |
| JP | 2020072342 A | | 5/2020 | |

\* cited by examiner

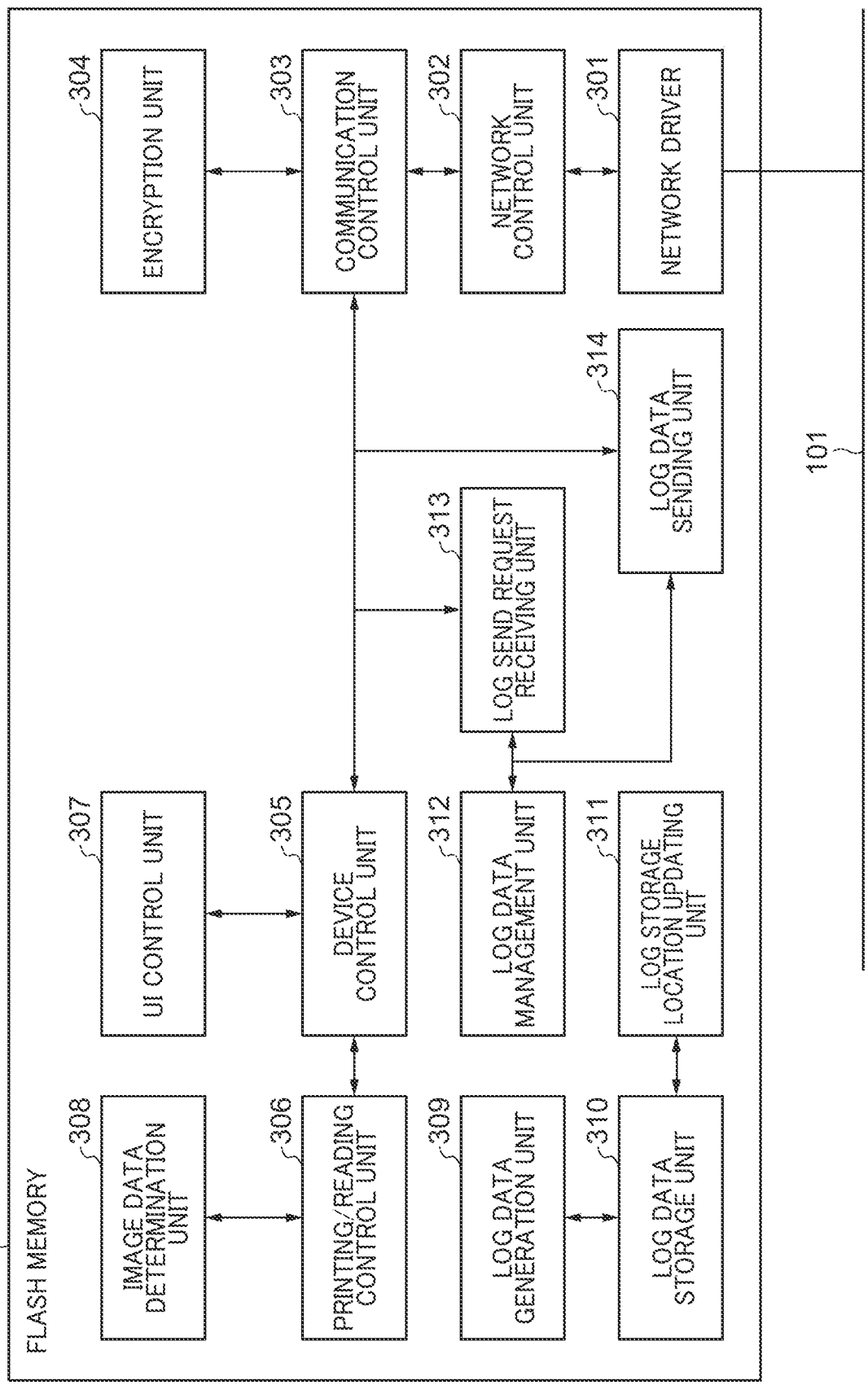

*FIG. 4*

| 400 | 401 | 402 | 403 | 404 | 405 |
|---|---|---|---|---|---|
| | LOG NUMBER | OBTAINMENT DATE AND TIME | OPERATION LOG AUTHENTICATION LOG | INSPECTION LOG | IMAGE LOG STORAGE PATH |
| | 1 | 2020/01/D1 HH:MM:SS | aaa1.log | AAA1.log | IMAGE FORMING APPARATUS100 /bbb1/ccc1/ddd1.img |
| | 2 | 2020/01/D2 HH:MM:SS | aaa2.log | NONE | IMAGE FORMING APPARATUS100 /bbb2/ccc2/ddd2.img |
| | 3 | 2020/01/D3 HH:MM:SS | aaa3.log | AAA3.log | IMAGE FORMING APPARATUS100 /bbb3/ccc3/ddd3.img |
| | 4 | 2020/01/D4 HH:MM:SS | aaa4.log | AAA4.log | PC102 /bbb4/ccc4/ddd4.img |
| | 5 | 2020/01/D5 HH:MM:SS | aaa5.log | NONE | IMAGE FORMING APPARATUS106 /bbb5/ccc5/ddd5.img |
| | 6 | 2020/01/D6 HH:MM:SS | aaa6.log | NONE | IMAGE FORMING APPARATUS106 /bbb5/ccc5/ddd6.img |
| | 7 | 2020/01/D7 HH:MM:SS | aaa7.log | NONE | NONE |
| | 8 | 2020/01/D8 HH:MM:SS | aaa8.log | AAA5.log | IMAGE FORMING APPARATUS100 /bbb5/ccc5/ddd7.img |

IMAGE FORMING APPARATUS COMMUNICABLE WITH COMMUNICATION APPARATUS, CONTROL METHOD FOR SAME, AND STORAGE MEDIUM

BACKGROUND OF THE INVENTION

Field of the Invention

The present invention relates to image forming apparatuses, control methods for the image forming apparatuses, and storage media.

Description of the Related Art

Locations where information equipment and image forming apparatuses are installed and environments for users of them have become diverse, and situations where they are not only accessed from inside a firewall but also accessed directly from an external network such as the Internet have been increasing. Negative consequences of information leakage and unauthorized operations in and out of offices have become problems. Under such circumstances, appropriate security is required to be used according to usage environments. In recent years, the concept regarding security has changed from securing the perimeter using firewalls to Zero Trust security that strictly protects devices directly connected to the Internet based on an assumption that devices should not be trusted by default.

A zero-trust environment assumes that information equipment and image forming apparatuses can be attacked from outside anytime and anywhere, regardless of where they are installed. Under such circumstances, when a security-related problem has occurred in an image forming apparatus, it is necessary to gather more traces of the operation of the image forming apparatus so as to analyze the cause of the problem and estimate the extent of damage. To address the issue, a technique for storing an audit log in a storage area has been proposed (see, for example, Japanese Laid-Open Patent Publication (Kokai) No. 2020-72432). Such an audit log includes, for example, an operation log indicating details of user's operations performed on an operation unit of an image forming apparatus, an authentication log indicating authentication information used in user authentication, a history of jobs executed by an image forming apparatus, and an image log including image data processed by print jobs, scan jobs, and so forth. By storing such an audit log in the storage area, the disclosed system is capable of, when a security-related problem has occurred, promptly presenting an audit log to a management server that analyzes the cause of the problem. This makes it possible to accurately assess the damage.

However, if an audit log includes a very large amount of data like an image log, sending the audit log to the management server increases network traffic.

SUMMARY OF THE INVENTION

The present invention provides image forming apparatuses capable of reducing network traffic in sending an audit log, control methods for the same, and storage media.

According to an aspect of the invention, an image forming apparatus, which is communicable with a communication apparatus, includes a storage device; and a memory and at least one processor and/or at least one circuit. The at least one processor and/or the at least one circuit is configured to perform operations of: storing an audit log including multiple types of logs in at least one of the storage device or an external storage device; and on receiving from the communication apparatus a request for sending the audit log, performing control for sending the audit log to the communication apparatus. The control includes, on receiving the request for sending the audit log, sending, to the communication apparatus, information indicating a storage location of one or more logs each having a data amount larger than a predetermined amount among the logs included in the audit log, rather than the one or more logs.

According to another aspect of the invention, a control method is provided for an image forming apparatus communicable with a communication apparatus. The control method includes: storing an audit log including multiple types of logs in at least one of a storage device of the image forming apparatus or an external storage device; and on receiving from the communication apparatus a request for sending the audit log, performing control for sending the audit log to the communication apparatus. The control includes, on receiving the request for sending the audit log, sending, to the communication apparatus, information indicating a storage location of one or more logs each having a data amount larger than a predetermined amount among the logs included in the audit log, rather than the one or more logs.

According to another aspect of the invention, an image forming apparatus, which is communicable with a management apparatus through a network, includes a storage device; and a memory and at least one processor and/or at least one circuit. The at least one processor and/or the at least one circuit is configured to perform operations of: storing log information including image data to be printed based on a print job, information indicating a storage location of the image data, and a history of execution of the print job, in the storage device; sending the log information other than the image data to the management apparatus; and on receiving from the management apparatus a request for sending the image data after sending the log information other than the image data to the management apparatus, sending the image data to the management apparatus.

According to the present invention, the image forming apparatus communicable with a communication apparatus or a management apparatus reduces network traffic in sending an audit log.

Further features of the present invention will become apparent from the following description of exemplary embodiments with reference to the attached drawings.

BRIEF DESCRIPTION OF THE DRAWINGS

FIG. 3 is a block diagram illustrating an example of software modules stored in the flash memory in FIG. 2.

FIG. 4 is a block diagram schematically illustrating an example of log management information that is managed by the log data management unit in FIG. 3.

DESCRIPTION OF THE EMBODIMENTS

A detailed description will now be given of an embodiment of the present invention with reference to the drawings. It should be noted that the embodiment described below does not limit the invention set forth in the claims, and all combinations of features in the embodiment described below should not always be essential to solving problems of the present invention.

Figure 1:
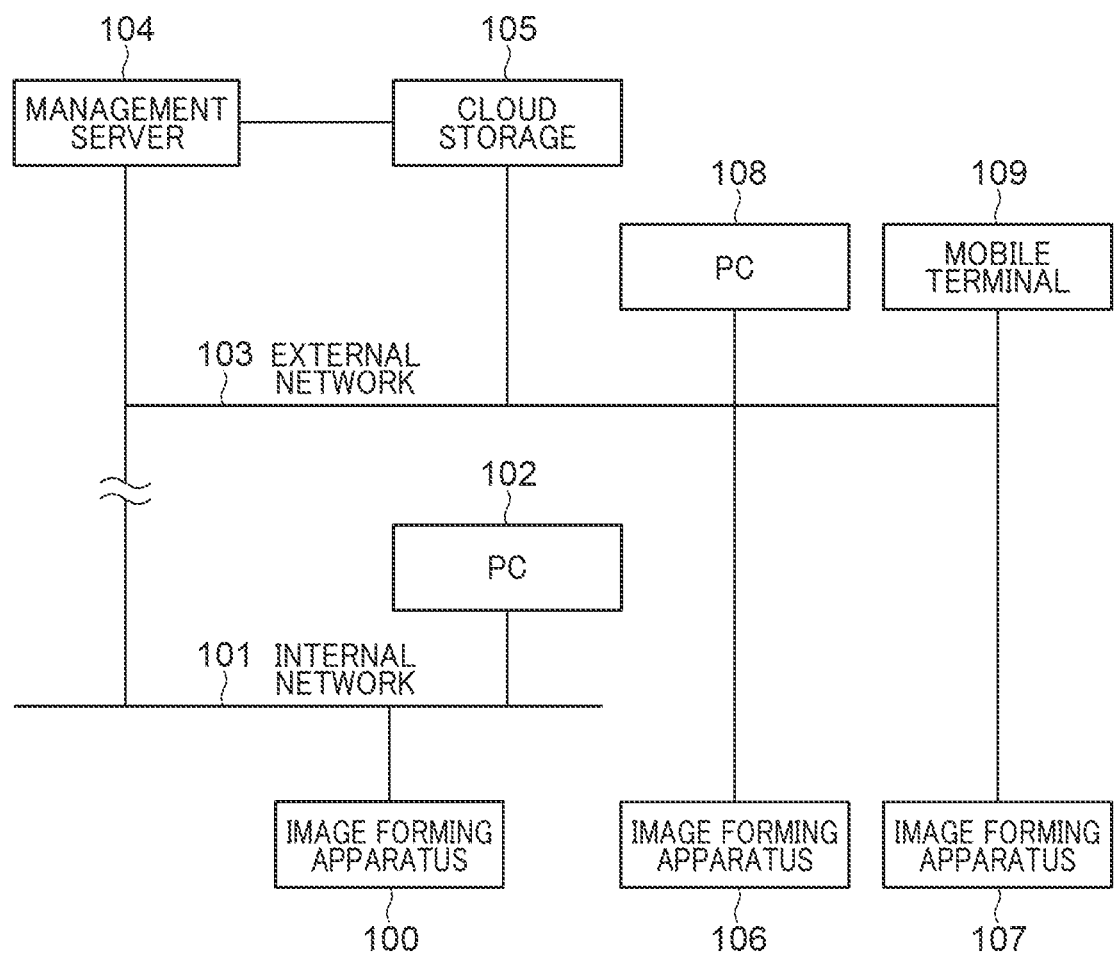
FIG. 1 is a network configuration diagram of an image forming apparatus according to an embodiment of the present invention.

FIG. 1 is a network configuration diagram of an image forming apparatus according to the present embodiment. In the present embodiment described below, for example, a system includes multiple image forming apparatuses installed in various environments i.e., an image forming apparatus 100, an image forming apparatus 106, and an image forming apparatus 107. It should be noted that it is assumed the system in FIG. 1 that the image forming apparatus 100 is installed in an office, the image forming apparatus 106 is installed in a shared area in a coworking office space, and the image forming apparatus 107 is installed at home for telecommuting use, but the locations where the image forming apparatuses are installed are not limited to them.

The image forming apparatus 100 is capable of communicating with communication apparatuses such as a PC 102 via an internal network 101. The internal network 101 is a network that is not directly accessible from the Internet. Example of the internal network 101 include an internal network protected by a firewall or gateway in the office where the image forming apparatus 100 is installed. The image forming apparatus 100 is configured to, for example, receive print data for executing printing by itself from the PC 102 and send image data generated by scanning, device information on the image forming apparatus 100, and so forth to the PC 102. The PC 102 is capable of issuing a request for performing user authentication, a request for referring to various types of information, an operation request, and so forth to the image forming apparatus 100. The image forming apparatus 100 is also capable of communicating with a management server 104 via the internal network 101 and an external network 103. The external network 103 is a network directly accessible from the Internet.

The management server 104 is capable of communicating via the external network 103 with a cloud storage 105, a file server (which is not illustrated), and so forth which store multiple pieces of print data. For example, the management server 104 sends print data selected by a user from the multiple pieces of print data stored in the cloud storage 105, to the image forming apparatus 100 designated by the user. The management server 104 obtains an audit log, which will be described later, for use in analyzing the cause of a security-related problem that has occurred in one of the image forming apparatus 100, the image forming apparatus 106, and the image forming apparatus 107 that have been registered.

The image forming apparatus 106 and the image forming apparatus 107 are capable of communicating with the management server 104, a PC 108, and a mobile terminal 109 via the external network 103. As with the image forming apparatus 100, the image forming apparatus 106 and the image forming apparatus 107 obtain, for example, print data stored in the cloud storage 105 via the management server 104. The PC 108 and the mobile terminal 109 are capable of issuing a request for performing user authentication, a request for referring to various types of information, an operation request, and so forth to the image forming apparatus 106 and the image forming apparatus 107. The PC 102, the PC 108, and the mobile terminal 109 are capable of directly accessing the cloud storage 105 without going through the management server 104. It should be noted that the numbers of image forming apparatuses, management servers, cloud storages, PCs, and mobile terminals are examples and not limitative.

A detailed description will now given of an arrangement of the image forming apparatus 100, the image forming apparatus 106, and the image forming apparatus 107. It should be noted that in the present embodiment, the image forming apparatus 100, the image forming apparatus 106, and the image forming apparatus 107 have the same arrangement, and therefore, a description will be given of the arrangement of the image forming apparatus 100 as an example.

Figure 2:
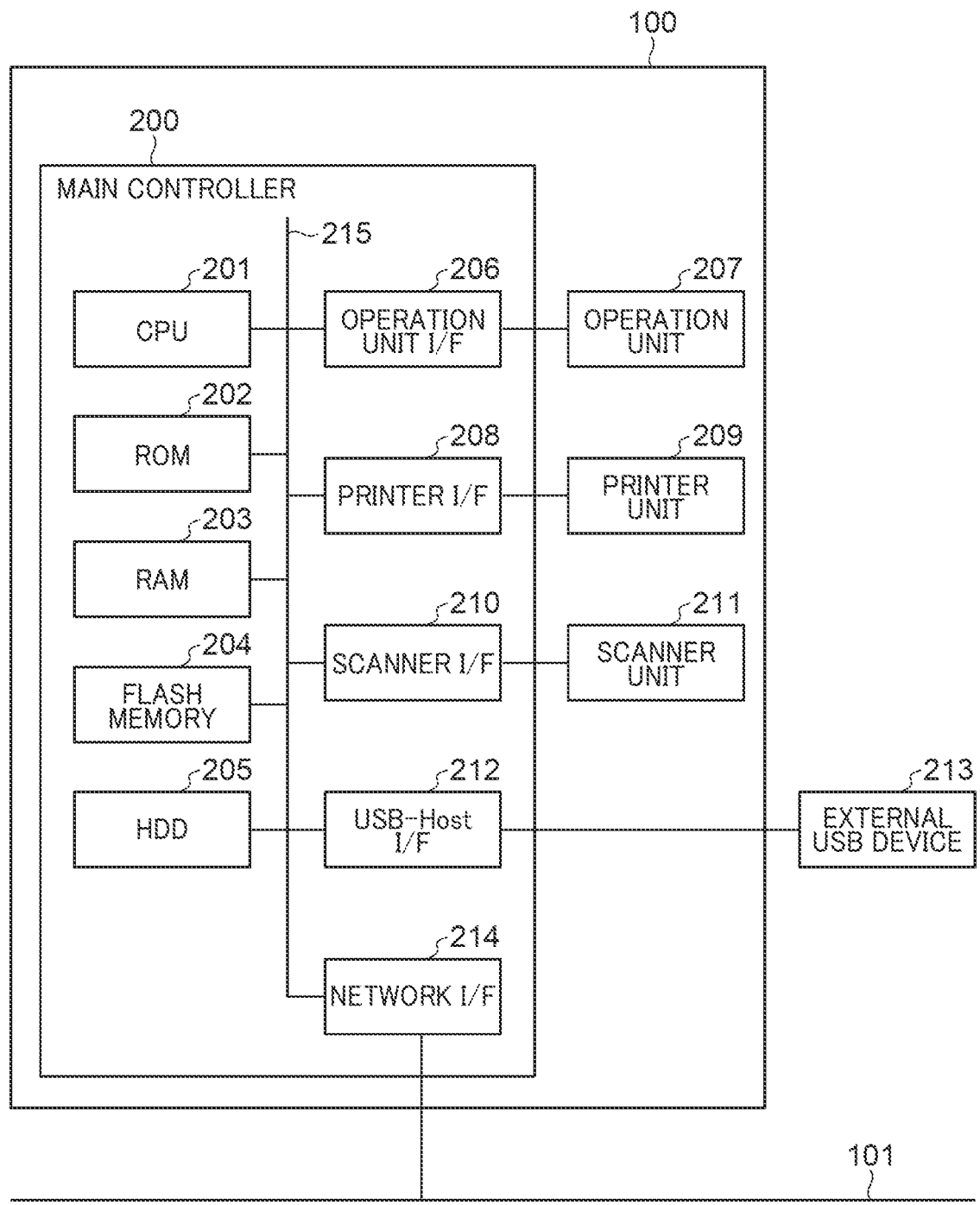
FIG. 2 is a block diagram schematically illustrating an arrangement of the image forming apparatus in FIG. 1.

FIG. 2 is a block diagram schematically illustrating the arrangement of the image forming apparatus 100 in FIG. 1. Referring to FIG. 2, the image forming apparatus 100 includes a main controller 200, an operation unit 207, a printer unit 209, and a scanner unit 211. The main controller 200 includes a CPU 201, a ROM 202, a RAM 203, a flash memory 204, an HDD 205, an operation unit I/F 206, a printer I/F 208, a scanner I/F 210, a USB Host I/F 212, and a network I/F 214. These components are connected to one another via a system bus 215.

The CPU 201 loads programs for the main controller 200, which are stored in the ROM 202 and the flash memory 204, into the RAM 203 and executes them. The programs for the main controller 200 include, for example, an application program for printing. When the CPU 201 executes the application program for printing, print data stored in the HDD 205 is converted into image data to be printed on a sheet by the printer unit 209. The image data is stored in the HDD 205. The programs for the main controller 200 also include, for example, an application program for scanning. When the CPU 201 executes the application program for scanning, the scanner unit 211 reads a placed original to generate image data of the original. The image data is also stored in the HDD 205.

The ROM 202, which is a read-only memory, stores a boot program for the main controller 200, a BIOS, fixed parameters, and so forth. The RAM 203, which is a random-access memory, is used as an area where the CPU 201 temporarily stores programs and data when controlling the main controller 200. The flash memory 204 stores an operating system, programs, and various software modules in FIG. 3, which will be described later. The flash memory 204 also stores license information for enabling functions of the image forming apparatus 100, control programs related to security, and so forth. The HDD 205, which is a hard disk drive, stores applications, various kinds of data, and print data received from the PC 102 or the like via the network I/F 214. The HDD 205 also stores an audit log, which will be described later.

The operation unit I/F 206 is an interface for connecting the operation unit 207 to the main controller 200. The operation unit I/F 206 sends an instruction, which is input through the operation unit 207 by a user, to the CPU 201. The operation unit I/F 206 also receives data, which is for displaying a screen on the operation unit 207, from the CPU 201 and sends the data to the operation unit 207. The operation unit 207, which includes a liquid crystal display (which is not illustrated) having a touch panel function, a keyboard (which is not illustrated), and so forth, displays the state of the image forming apparatus 100 and an operational menu and receives instructions from a user.

The printer I/F 208 is an interface for connecting the printer unit 209 to the main controller 200. The printer unit 209 prints image data, which is obtained from the printer I/F 208, on a sheet. The scanner unit 211 is an interface for connecting the scanner unit 211 to the main controller 200. The scanner unit 211 uses a line sensor, which is comprised of a CCD (Charge-Coupled Device), to read a placed original and generate image data of the original. The scanner unit 211 stores the generated image data in the HDD 205. The image data stored in the HDD 205 is, for example, printed on a sheet by the printer unit 209. A copying process is implemented by the printer unit 209 printing image data generated by the scanner unit 211 on a sheet.

The USB Host I/F 212 is an interface for connecting an external USB device 213 to the main controller 200. The external USB device 213 is, for example, a USB memory or USB keyboard. The main controller 200 obtains an update file, which is required for firmware update, from the USB memory connected to the USB Host I/F 212. The external USB device 213 is, for example, a fax unit. The fax unit connected to the USB Host I/F 212 obtains image data, which is stored in the HDD 205, via the USB Host I/F 212 and sends the obtained image data by fax. The fax unit connected to the USB Host I/F 212 also generates image data based on data sent by fax from an external apparatus and stores the image data in the HDD 205 via the USB Host I/F 212. It should be noted that the image data stored in the HDD 205 is printed on a sheet by the printer unit 209 as described above.

The network I/F 214 connects the main controller 200 to the internal network 101. The network I/F 214 carries out communications with the PC 102 via the internal network 101. The network I/F 214 also carries out communications with the management server 104 via the internal network 101 and the external network 103.

FIG. 3 is a block diagram illustrating an example of the software modules stored in the flash memory 204 in FIG. 2. Referring to FIG. 3, for example, a network driver 301, a network control unit 302, a communication control unit 303, an encryption unit 304, a device control unit 305, a printing/reading control unit 306, a UI control unit 307, an image data determination unit 308, a log data generation unit 309, a log data storage unit 310, a log storage location updating unit 311, a log data management unit 312, a log send request receiving unit 313, and a log data sending unit 314 (sending control unit) are stored in the flash memory 204. Processes of these software modules are implemented by the CPU 201 loading a software module, which is a target to be executed, from the flash memory 204 into the RAM 203 and executing the same.

The network driver 301 sends and receives data to and from an external apparatus by controlling the network I/F 214. The network control unit 302 sends and receives data by controlling communication in the transport layer and layers below it in a network communication protocol such as TCP/IP. The communication control unit 303 is a module for controlling a plurality of communication protocols supported by the image forming apparatus 100. Communication encrypted using TLS or the like supported by the image forming apparatus 100 is also controlled by the communication control unit 303. The encryption unit 304 is a module for carrying out a data encryption/decryption process, various types of encryption processes such as generation and verification of electronic signatures and generation of hash values. In communication encrypted using TLS or the like carried out by the communication control unit 303, the encryption unit 304 carries out an encryption process.

The device control unit 305 is a module for integratedly controlling the image forming apparatus 100 by generating control commands and control data for the image forming apparatus 100. For example, the device control unit 305 performs user authentication, which is ordered via the operation unit 207 or the network I/F 214. The printing/reading control unit 306 is a module for executing functions such as printing using the printer unit 209 and reading of originals using the scanner unit 211. The image data determination unit 308 inspects image data to be printed on a sheet by the printer unit 209 and image data generated by the scanner unit 211. Specifically, the image data determination unit 308 determines whether or not the image data includes any invalid characters or any invalid image. In the present embodiment, scanning and printing are restricted based on respective results of the determination. In addition, the transmission of image data to external apparatuses via the network I/F 214 is also restricted based on a result of the determination.

The log data generation unit 309 generates an audit log indicating a trail of operations of the image forming apparatus 100. The audit log includes multiple types of logs, for example, an operation log, an authentication log, a job log, an image log, an inspection log, and an engine log. An operation log is log data indicating a history of instructions input to the operation unit 207 by a user. An authentication log includes authentication information such as IDs and passwords used in user authentication. Authentication information includes, for example, information input to the operation unit 207 by a user or information obtained from an IC card swiped by a user. A job log is log data indicating a history of jobs such as scan jobs and print jobs. An image log includes, for example, image data printed on sheets by the printer unit 209 in print jobs and image data generated by the scanner unit 211 in scan jobs. An inspection log is log data indicating results of inspection processes carried out by the image data determination unit 308. An engine log includes detailed operational parameters such as conditions of sensors in the printer unit 209 and the scanner unit 211 and operational environments. In an audit log, for example, an operation log, an authentication log, and an inspection log each has a relatively small amount of data, and as compared to these logs, an image log has a very large amount of data.

The log data storage unit 310 performs control to store an audit log, which is generated by the log data generation unit 309, in the HDD 205 or another storage device. The log storage location updating unit 311 carries out a storage location updating process when a storage location of a part of an audit log stored by the log data storage unit 310, for example, a log having a large data amount such as an image log has been updated. The log data management unit 312 manages data in audit logs that have been stored. Specifically, based on log management information 400 in FIG. 4, the log data management unit 312 manages files names and storage locations of respective logs included in audit logs stored in the HDD 205. Also, when the image forming apparatus 100 has received an audit log send request, the log data management unit 312 identifies types of logs included by the audit log that should be sent to a sender of this audit log send request.

The log send request receiving unit 313 notifies the log data management unit 312 of contents of an audit log send request that the image forming apparatus 100 has received.

The log data sending unit 314 sends logs identified by the log data management unit 312 to a sender of the audit log send request.

FIG. 4 is a block diagram schematically illustrating an example of the log management information 400 that is managed by the log data management unit 312 in FIG. 3. The log management information 400 is stored in HDD 205 or the like. The log management information 400 is comprised of a log number 401, an obtainment date and time 402, an operation log and authentication log 403, an inspection log 404, and an image log storage path 405. It should be noted that the log management information 400 should not always have this configuration but may have other items.

A management number for identifying an audit log generated by the log data generation unit 309 is set as the log number 401. In the present embodiment, an audit log is generated with respect to each job or specific operation or at regular time intervals, and management numbers are assigned to the respective generated audit logs. The generated audit logs are stored in the HDD 205. Examples of a trigger for storage of an audit log include an operation on the operation unit 207 by a user, an authentication process, an image control process such as image transfer or conversion, execution of a job like a scan job or a print job, and a change in status such as a power state transition.

A date and time when an audit log was stored in the HDD 205 is set as the obtainment date and time 402. A file name of an operation log and authentication log included in an audit log is set as the operation log and authentication log 403. In the present embodiment, the operation log and authentication log 403 is always included in an audit log as illustrated in FIG. 4.

A file name of an inspection log, which is a result of an inspection process by the image data determination unit 308, is set as the inspection log 404. In the present embodiment, the inspection process is carried out by the image data determination unit 308 only when a job handles image data and an inspection setting is enabled. Accordingly, as illustrated in FIG. 4, some audit logs include inspection logs while others include no inspection log.

A storage path indicating a storage location of image data corresponding to an image log included in an audit log is set as the image log storage path 405. In the present embodiment, the storage path is set as the image log storage path 405 for an audit log of a job that handles image data (see, for example, the management numbers 1 to 6 and 8 in FIG. 4). On the other hand, the storage path is not set as the image log storage path 405 for an audit log stored according to an occurrence of an event that does not handle image data, for example, a power control event such as shift to a sleep mode or return from a sleep mode, an event in which a network packet has been sent or received, or an event in which some error has been detected (see, for example, the management number 7 in FIG. 4). An image log may be stored in a storage location different from the HDD 205, for example, a storage device of another apparatus because image logs have very large amounts of data as described above. In this case, a storage path indicating the storage device of the other apparatus is set as the image log storage path 405 (see, for example, the management numbers 4 to 6 in FIG. 4).

Figure 5:
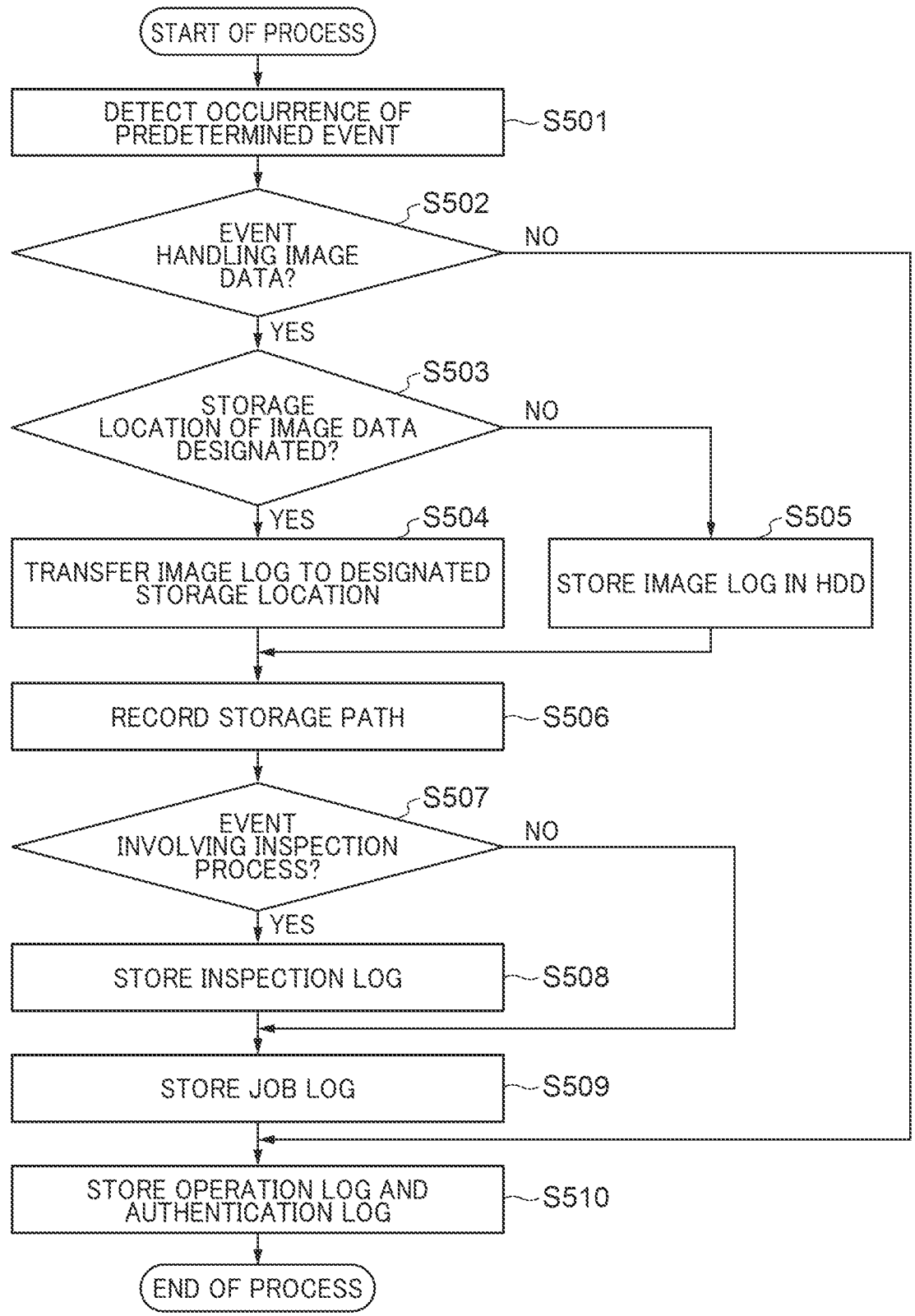
FIG. 5 is a flowchart illustrating the procedure of an audit log storage process that is carried out by the image forming apparatus in FIG. 1.

FIG. 5 is a flowchart illustrating the procedure of an audit log storage process that is carried out by the image forming apparatus 100 in FIG. 1. The audit log storage process in FIG. 5 is implemented by the CPU 201 executing a program stored in the flash memory 204.

Referring to FIG. 5, first, the CPU 201 detects that a predetermined event, which is a trigger for storage of an audit log, has occurred (step S501). Examples of the predetermined event include an event of an operation on the operation unit 207 by a user, an event in which an authentication process is carried out, an event in which an image control process such as image transfer or conversion is carried out, an event in which a job like a scan job or a print job is executed, and an event of a status change such as a power state transition. Next, the CPU 201 determines whether or not the predetermined event is an event that handles image data (step S502).

As a result of the determination in the step S502, when the predetermined event is an event that handles image data, the CPU 201 determines whether or not a storage location of the image data has been designated (step S503). In the present embodiment, the HDD 205 has been set in advance as a default storage location of the image data, but a user may designate a storage location other than the HDD 205 for the image data. For example, a user may designate, as the storage location of the image data, a storage device like the flash memory 204 in the image forming apparatus 100 other than the HDD 205 or a storage device of another apparatus different from the image forming apparatus 100.

As a result of the determination in the step S503, when the storage location of the image data has been designated, the CPU 201 transfers an image log including the image data to the designated storage location (step S504). The audit log storage process then proceeds to step S506.

As a result of the determination in the step S503, when the storage location of the image data has not been designated, the CPU 201 stores the image log including the image data in the HDD 205 (step S505). Then, the CPU 201 records a storage path indicating the storage location where the image log was stored in the step S504 or S505 as the image log storage path 405 in the log management information 400 (step S506). After that, the CPU 201 determines whether or not the predetermined event is an event that involves an inspection process by the image data determination unit 308 (step S507). In the step S507, for example, when inspection is enabled, the CPU 201 determines that the predetermined event is an event that involves an inspection process by the image data determination unit 308. On the other hand, when inspection is disabled, the CPU 201 determines that the predetermined event is not an event that involves an inspection process by the image data determination unit 308.

As a result of the determination in the step S507, when the predetermined event is an event that involves an inspection process by the image data determination unit 308, the CPU 201 stores an inspection log, which is a result of the inspection process carried out by the image data determination unit 308, in the HDD 205 (step S508). The CPU 201 also records a file name of the inspection log, which was stored in the step S508, as the inspection log 404 in the log management information 400. The audit log storage process then proceeds to step S509.

As a result of the determination in the step S507, when the predetermined event is not an event that involves an inspection process by the image data determination unit 308, the audit log storage process proceeds to the step S509. The CPU 201 then stores a job log of a job executed in accordance with the occurrence of the predetermined event in the HDD 205 (step S509). Thus, in the present embodiment, no inspection log is included in an audit log stored in the HDD 205 when a job does not involve an inspection process by the image data determination unit 308. The CPU 201 then stores an operation log and an authentication log in accordance with the occurrence of the predetermined event in the HDD 205 (step S510) and records a file name of these logs as the operation log and authentication log 403 in the log management information 400. After that, the audit log storage process is ended.

As a result of the determination in the step S502, when the predetermined event is not an event that handles image data, the audit log storage process proceeds to step S510, in which the CPU 201 in turn stores only the operation log and the authentication log in the HDD 205. Thus, in the present embodiment, neither image log nor inspection log is included in an audit log stored in the HDD 205 in a case where the predetermined event is not an event that handles image data. After that, the audit log storage process is ended.

It should be noted in the process in FIG. 5, logs to be stored in the HDD 205 may be varied according to the storage capacity of the HDD 205 and the usage environment of the image forming apparatus 100.

Moreover, in the process in FIG. 5, a type of a log to be stored in the HDD 205 may be set by a user via a setting screen.

Figure 6:
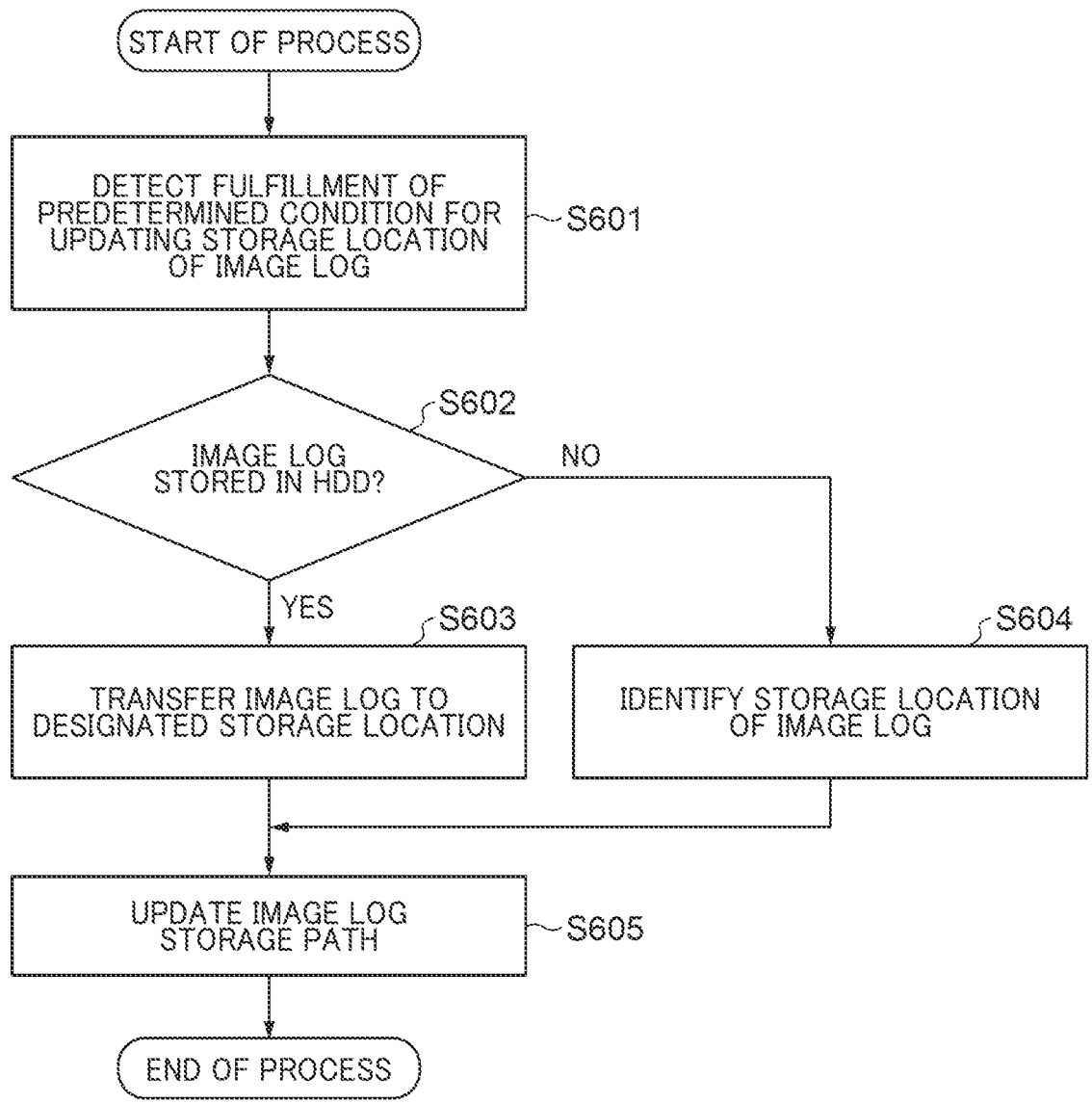
FIG. 6 is a flowchart illustrating the procedure of an audit log storage location updating process that is carried out by the image forming apparatus in FIG. 1.

FIG. 6 is a flowchart illustrating the procedure of an audit log storage location updating process that is carried out by the image forming apparatus 100 in FIG. 1. As with the audit log storage process in FIG. 5, the audit log storage location updating process in FIG. 6 is implemented by the CPU 201 executing a program stored in the flash memory 204.

Referring to FIG. 6, the CPU 201 detects that a predetermined condition for updating a storage location of image logs has been fulfilled (step S601). This predetermined condition is, for example, that a user inputs a storage location updating instruction to the operation unit 207, a storage location updating instruction is received from the management server 104 or the like, the capacity of the HDD 205 that has been used has reached a predetermined amount, or a predetermined time period has elapsed since an image log was stored. The CPU 201 then determines whether or not any image log is stored in the HDD 205 (step S602).

As a result of the determination in the step S602, when an image log or logs are stored in the HDD 205, the CPU 201 transfers this image log or logs to a storage location newly designated by a user (step S603). The audit log storage location updating process then proceeds to step S605.

As a result of the determination in the step S602, when no image log is stored in the HDD 205, the CPU 201 identifies storage locations of image logs from the log management information 400 (step S604). The CPU 201 performs control to transfer the image logs from the identified storage locations to the newly designated storage location. The CPU 201 then updates the image log storage path 405 in the log management information 400 (step S605) and ends the present process.

Figure 7:
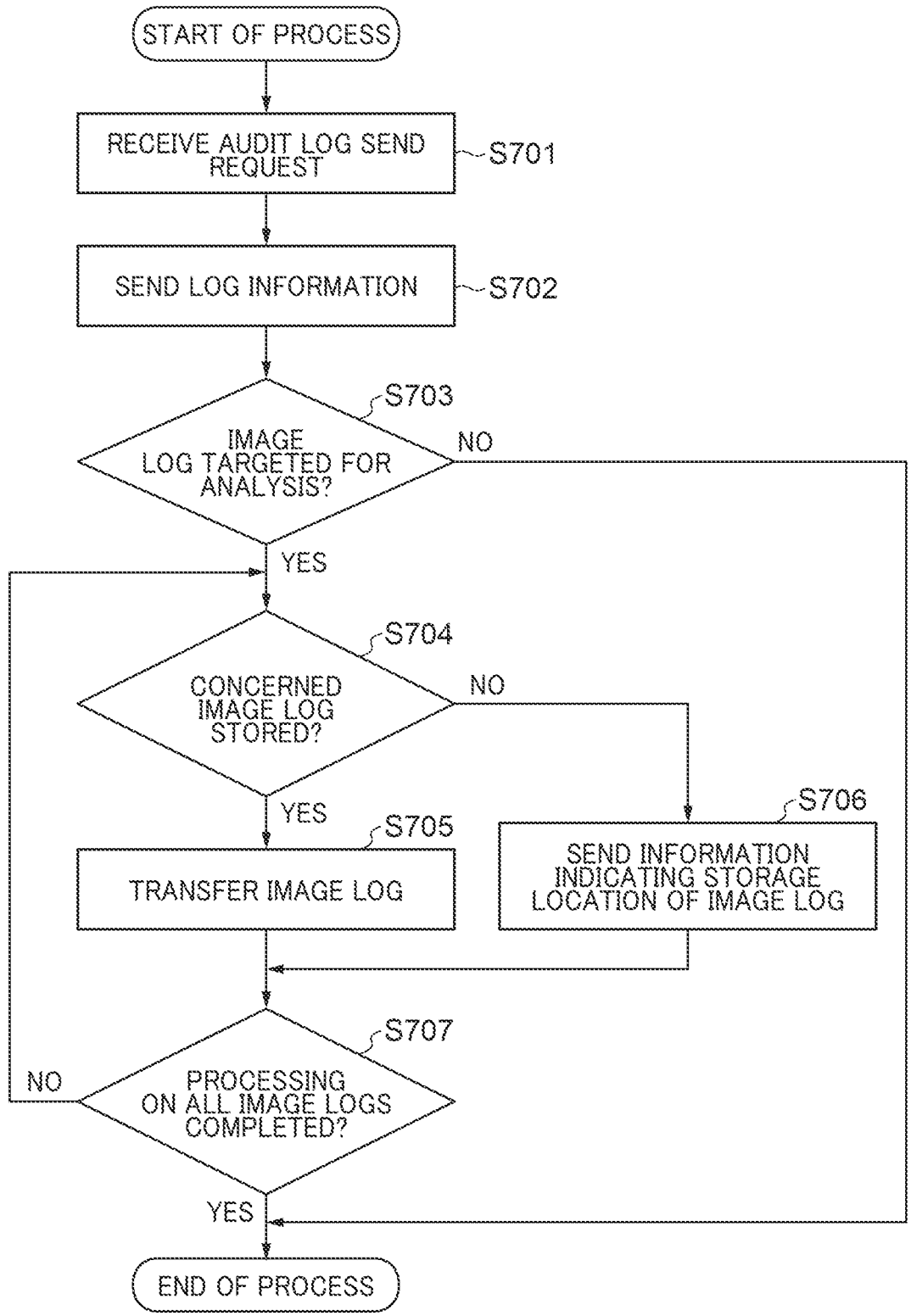
FIG. 7 is a flowchart illustrating the procedure of a log sending process that is carried out by the image forming apparatus in FIG. 1.

FIG. 7 is a flowchart illustrating the procedure of a log sending process that is carried out by the image forming apparatus 100 in FIG. 1. As with the audit log storage process in FIG. 5, the log sending process in FIG. 7 is implemented by the CPU 201 executing a program stored in the flash memory 204.

Referring to FIG. 7, the CPU 201 receives an audit log send request (step S701). When, for example, a security-related problem has occurred in the image forming apparatus 100, an audit log send request is sent from the management server 104 so as to analyze the cause of this problem and estimate the extent of damage. In accordance with the received audit log send request, the CPU 201 sends log information to the management server 104 (step S702). The log information includes an operation log, an authentication log, and an inspection log for which a file name is set in the log management information 400. Namely, in the step S702, an image log having a very large data amount (greater than a predetermined amount) is not sent to the management server 104, but information indicating a storage location of the image log, which is recorded in the management server 104, is sent to the management server 104. The operation log, the authentication log, and the inspection log each has a relatively small data amount, and hence even if they are collectively sent to the management server 104, network traffic is very unlikely to increase. Based on the received log information, the management server 104 starts an analyzing process to analyze the cause of the problem and sends a response notification, which indicates that the log information has been successfully received, to the image forming apparatus 100. Here, when an image log that is not included in the log information is required for the analyzing process, the management server 104 sends a response notification, which indicates a request for sending an image log to be analyzed in the analyzing process, to the image forming apparatus 100. Based on the response notification received from the management server 104, the CPU 201 determines whether or not the image log is a target for analysis (step S703).

As a result of the determination in the step S703, when the image log is not a target for analysis, the CPU 201 ends the present process. As a result of the determination in the step S703, when the image log is a target for analysis, the CPU 201 determines whether or not an image log indicated in the response notification received from the management server 104 is stored in a storage device of the image forming apparatus 100 (step S704). When the image log is stored in a storage device of the image forming apparatus 100, for example, the HDD 205 or the flash memory 204, the CPU 201 determines that the image log is stored in the storage device of the image forming apparatus 100. On the other hand, when the image log is not stored in the above-mentioned storage device of the image forming apparatus 100, the CPU 201 determines that the image log is not stored in the storage device of the image forming apparatus 100. Here, when, for example, there is a plurality of image logs indicated in the response notification received from the management server 104, the CPU 201 identifies in step S704 one image log among the plurality of indicated image logs and determines whether or not the identified image log is stored in the above-mentioned storage device of the image forming apparatus 100.

As a result of the determination in the step S704, when the image log indicated in the response notification received from the management server 104 is stored in the storage device of the image forming apparatus 100, the CPU 201 transfers the image log to the management server 104 (step S705). The log sending process then proceeds to step S707.

As a result of the determination in the step S704, when the image log indicated in the response notification received from the management server 104 is not stored in the storage device of the image forming apparatus 100, the CPU 201 identifies a storage location of the image log from the log management information 400. The CPU 201 sends information indicating the storage location of the image log to the management server 104 (step S706). The information indicating the storage location of the image log is, for example, a storage path indicating the storage location of this image log. The management server 104 obtains the image log from the storage location indicated by the received information. The CPU 201 then determines whether or not processing of all image logs indicated in the response notification received from the management server 104 has been completed (step S707).

As a result of the determination in the step S707, when processing of all image logs indicated in the response notification received from the management server 104 has not been completed, the log sending process returns to the step S704. The CPU 201 identifies another image log among the plurality of image logs and determines whether or not the identified image log is stored in the above-described storage device of the image forming apparatus 100.

As a result of the determination in the step S707, when processing of all image logs indicated in the response notification received from the management server 104 has been completed, the log sending process is ended.

According to the embodiment described above, in response to receiving an audit log send request (a request for sending an audit log), the image forming apparatus 100 sends, to the management server 104, the log management information 400 indicating a storage location of an image log (one or more logs each having a data amount larger than a predetermined amount) among a plurality of logs included in the audit log stored in at least one of a storage device of the image forming apparatus 100 or an external storage device, without sending the image log itself. This prevents one or more logs with large data amounts from being sent to the management server 104 when an audit log is sent, and therefore, reduces network traffic when sending the audit log.

Moreover, in the embodiment described above, in response to receiving a request for sending an audit log, the image forming apparatus 100 sends logs except for an image log (one or more logs each having a data amount larger than a predetermined amount) among a plurality of logs included in an audit log, along with the log management information 400 to the management server 104. As a result, the cause of a security-related problem can be analyzed based on logs other than one or more logs with large data amounts.

Furthermore, in the embodiment described above, in accordance with the reception of a response notification indicating an image data send request from the management server 104 after the log management information 400 is sent, the image forming apparatus 100 sends an image log (one or more logs each having a data amount larger than a predetermined amount) to the management server 104. As a result, an image log (one or more logs each having a data amount larger than a predetermined amount) can be provided to the management server 104 as the need arises while network traffic in sending an audit log is reduced to a minimum.

In the embodiment described above, an audit log includes an operation log, an authentication log, an image log, and an inspection log. As a result, a wide variety of logs that make it possible to analyze the cause of a security-related problem that has occurred can be provided to the management server 104 while network traffic in sending an audit log is kept to a minimum.

In the embodiment described above, in a case where the predetermined event is not an event that handles image data, the audit log stored in HDD 205 includes neither an image log nor an inspection log. As a result, the data amount of an audit log generated in accordance with the occurrence of an event that does not handle image data can be kept to a minimum necessary, and therefore, the capacity of the HDD 205 to be used can be reduced.

In the embodiment described above, in a case where the predetermined event is not an event that involves an inspection process given by the image data determination unit 308, the audit log stored in the HDD 205 does not include an inspection log. As a result, the data amount of an audit log generated in accordance with the occurrence of an event that does not involve an inspection process by the image data determination unit 308 can be kept to a minimum necessary, and therefore, the capacity of the HDD 205 to be used can be reduced.

It should be noted that although in the embodiment described above, the management server 104 sends an audit log send request, the sender of the audit log send request is not limited to the management server 104 but has only to be an apparatus capable of analyzing the cause of a security-related problem.

Moreover, although in the embodiment described above, the image forming apparatus 100 carries out the processes in FIGS. 5 to 7, the image forming apparatus 106 or the image forming apparatus 107 may carry out the processes in FIGS. 5 to 7. As a result, when a security-related problem has occurred in the image forming apparatus 106 or the image forming apparatus 107, the cause of the problem can be analyzed based on information that has been obtained from the image forming apparatus 106 or the image forming apparatus 107 by the management server 104.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-105934 filed on Jun. 25, 2021 which is hereby incorporated by reference wherein in its entirety.

What is claimed is:

1. An image forming apparatus communicable with a communication apparatus, the image forming apparatus comprising:

a storage device; and a memory and at least one processor or at least one circuit configured to:

store an audit log, upon occurrence of a predetermined event, in at least one of the storage device or an external storage device, the audit log including:

an operation log indicating a history of instructions input by a user; and an authentication log indicating authentication information used in user authentication;

storing, in the audit log, an image log including image data processed by a job, in a state where the predetermined event occurs that handles image data;

storing, in the audit log, an inspection log indicating a result of an inspection of the image data, in a state where the audit log is storing the image log and the predetermined event occurs that involves the inspection of the image data, wherein the operation log, the authentication log, the inspection log, and a storage location of the image data are stored in association with a log number separately as log management information; and upon receiving from the communication apparatus a request for sending the audit log, control sending of the logs included in the audit log to the communication apparatus, wherein the control includes:

sending, to the communication apparatus, information indicating a storage location of one or more logs each having a data amount larger than a predetermined amount, among the logs included in the audit log, rather than sending the one or more logs included in the audit log.

2. The image forming apparatus according to claim 1, wherein the at least one processor or the at least one circuit, in the control of sending the audit log, upon receiving from the communication apparatus the request for sending the audit log, sends, to the communication apparatus, the logs included in the audit log except for the one or more logs, among the logs included in the audit log, along with the information indicating the storage location of the one or more logs.

3. The image forming apparatus according to claim 1, wherein the at least one processor or the at least one circuit, in the control of sending the audit log, upon receiving from the communication apparatus a further request for sending the one or more logs each having the data amount larger than the predetermined amount after sending the information indicating the storage location of the one or more logs, sends the one or more logs to the communication apparatus.

4. The image forming apparatus according to claim 1, wherein:

the communication apparatus is a management apparatus that is communicable through a network, and the image data is to be printed based on a print job.

5. The image forming apparatus according to claim 4, wherein, in a state where the image data is not stored in the storage device, information indicating a storage location of the image data is sent to the management apparatus.

6. The image forming apparatus according to claim 4, wherein a type of the data relating to the image data to be sent to the management apparatus is determined based on whether or not the image data is a target for analysis by the management apparatus.

7. A control method for an image forming apparatus communicable with a communication apparatus, the control method comprising:

storing an audit log, upon occurrence of a predetermined event, in at least one of a storage device of the image forming apparatus or an external storage device, the audit log including:

an operation log indicating a history of instructions input by a user; and an authentication log indicating authentication information used in user authentication;

storing, in the audit log, an image log including image data processed by a job, in a state where the predetermined event occurs that handles image data;

storing, in the audit log, an inspection log indicating a result of an inspection of the image data, in a state where the audit log is storing the image log and the predetermined event occurs that involves the inspection of the image data, wherein the operation log, the authentication log, the inspection log, and a storage location of the image data are stored in association with a log number separately as loci management information; and upon receiving from the communication apparatus a request for sending the audit log, controlling sending of the logs included the audit log to the communication apparatus, wherein the control includes:

sending, to the communication apparatus, information indicating a storage location of one or more logs each having a data amount larger than a predetermined amount among the logs included in the audit log, rather than sending the one or more logs included in the audit log.

8. A non-transitory computer-readable storage medium storing a program executable by a computer to execute a control method for an image forming apparatus communicable with a communication apparatus, the control method comprising:

storing an audit log, upon occurrence of a predetermined event, in at least one of a storage device of the image forming apparatus or an external storage device, the audit log including:

an operation log indicating a history of instructions input by a user; and an authentication log indicating authentication information used in user authentication;

storing, in the audit log, an image log including image data processed by a job, in a state where the predetermined event occurs that handles image data;

storing, in the audit log, an inspection log indicating a result of an inspection of the image data, in a state where the audit log is storing the image log and the predetermined event occurs that involves the inspection of the image data, wherein the operation log, the authentication log, the inspection log, and a storage location of the image data are stored in association with a log number separately as loci management information; and upon receiving from the communication apparatus a request for sending the audit log, controlling sending of the logs included the audit log to the communication apparatus, wherein the control includes:

sending, to the communication apparatus, information indicating a storage location of one or more logs each having a data amount larger than a predetermined amount among the logs included in the audit log, rather than sending the one or more logs included in the audit log.

\* \* \* \* \*